US012249308B2

(12) United States Patent
Yoshino

(10) Patent No.: US 12,249,308 B2
(45) Date of Patent: Mar. 11, 2025

(54) DRUMHEAD, PERCUSSION INSTRUMENT AND TENSION APPLICATION METHOD

(71) Applicant: Roland Corporation, Shizuoka (JP)

(72) Inventor: Kiyoshi Yoshino, Shizuoka (JP)

(73) Assignee: Roland Corporation, Shizuoka (JP)

( * ) Notice: Subject to any disclaimer, the term of this patent is extended or adjusted under 35 U.S.C. 154(b) by 375 days.

(21) Appl. No.: 17/850,964

(22) Filed: Jun. 27, 2022

(65) Prior Publication Data

US 2023/0169944 A1 Jun. 1, 2023

(30) Foreign Application Priority Data

Nov. 29, 2021 (JP) ................................ 2021-193247

(51) Int. Cl.
*G10H 3/14* (2006.01)
*G10D 13/10* (2020.01)

(52) U.S. Cl.
CPC ............ *G10H 3/146* (2013.01); *G10D 13/26* (2020.02); *G10H 2230/275* (2013.01)

(58) Field of Classification Search
CPC .... G10H 3/146; G10H 2230/275; G10H 1/32; G10D 13/26; G10D 13/16; G10D 13/20; G10D 13/02
See application file for complete search history.

(56) References Cited

U.S. PATENT DOCUMENTS 2,620,703 A 12/1952 Lebensfeld et al.
4,457,202 A 7/1984 Debarbrie
5,323,678 A 6/1994 Yould
2007/0234873 A1 10/2007 Lane
2018/0315402 A1 11/2018 Wish

FOREIGN PATENT DOCUMENTS

FR 2902921 12/2007
JP H04135788 12/1992
JP 2006030235 A * 2/2006 ............ G10D 13/02
JP 2019148623 9/2019

OTHER PUBLICATIONS

"Search Report of Europe Counterpart Application", issued on Nov. 21, 2022, p. 1-p. 12.
"Office Action of Europe Counterpart Application", issued on Aug. 24, 2023, p. 1-p. 8.

* cited by examiner

*Primary Examiner* — Kimberly R Lockett
(74) *Attorney, Agent, or Firm* — JCIPRNET

(57) ABSTRACT

A frame body fixed to a membrane 10 is divided into multiple long-side frame bodies 11 and a short-side frame body aligned in a peripheral direction of a frame 3. Tension is applied to the frame body 10 by pulling each frame body 11, 12. Accordingly, it is not necessary to make the shape of each frame body 11, 12 consistent with the frame 3 (support part 30) in a complicated polygonal shape, and the shape of each frame body 11, 12 can be formed as a linear shape. Therefore, the shape of each frame body 11, 12 hardly varies. In addition, even if the shape of each frame body 11, 12 varies, tension can be uniformly applied to the membrane 10, as it is configured that each frame body 11, 12 is pulled to apply tension to the membrane 10.

17 Claims, 7 Drawing Sheets

(a)

(b)

(a)

(b)

(a)

(b)

DRUMHEAD, PERCUSSION INSTRUMENT AND TENSION APPLICATION METHOD

CROSS-REFERENCE TO RELATED APPLICATION

This application claims the priority benefit of Japan application serial no. 2021-193247 filed on Nov. 29, 2021. The entirety of the above-mentioned patent application is hereby incorporated by reference herein and made a part of this specification.

BACKGROUND

Technical Field

The invention relates to a drumhead, a percussion instrument and a tension application method, and particularly relates to a drumhead, a percussion instrument and a tension application method capable of uniformly applying tension to a membrane.

Description of Related Art

A drumhead which includes a membrane forming a striking surface struck by a performer and an annular frame body connected to the outer edge of the membrane is known. In such drumhead, as described in Patent Document 1, for example, it is common to apply tension to the membrane by pressing the frame body to the side of the body of a percussion instrument through a hoop.

PRIOR ART DOCUMENT

Patent Document

Patent Document 1: Japanese Laid-open No. 2019-148623 (e.g., para. 0027, FIGS. 1, 2).

However, in the conventional art, in order to evenly apply tension to the membrane, it is necessary to form the frame body in a shape (e.g., an annular shape that is nearly a perfect circle, if the body is in a cylindrical shape) substantially consistent with the outer shape of the body. Accordingly, when the shape of the frame body varies, an issue that tension cannot be evenly applied to the membrane arises.

SUMMARY

A drumhead according to an aspect of the invention includes: a membrane, forming a striking surface of a percussion instrument; and multiple frame bodies, connected to an outer edge of the membrane and aligned along the outer edge of the membrane. In a case of being installed to the percussion instrument, each of the multiple frame bodies is pulled to apply tension to the membrane.

A percussion instrument according to an aspect of the invention includes: the above drumhead; a frame, being annular and having a support part supporting the membrane on an inner peripheral side with respect to the frame body of the drumhead; and a tension application member, pulling downward each of the plurality of frame bodies on an outer peripheral side of the support part of the frame.

A tension application method according to another aspect of the invention is a tension application method which applying tension to a membrane of a drumhead including: the membrane, forming a striking surface of a percussion instrument; and multiple frame bodies connected to an outer edge of the membrane and aligned along the outer edge of the membrane. The tension application method includes: applying the tension to the membrane by pulling each of the multiple frame bodies in a case where the drumhead is installed to the percussion instrument.

DESCRIPTION OF THE EMBODIMENTS

The invention provides a drumhead and a tension application method capable of evenly applying tension to the membrane.

Figure 1:
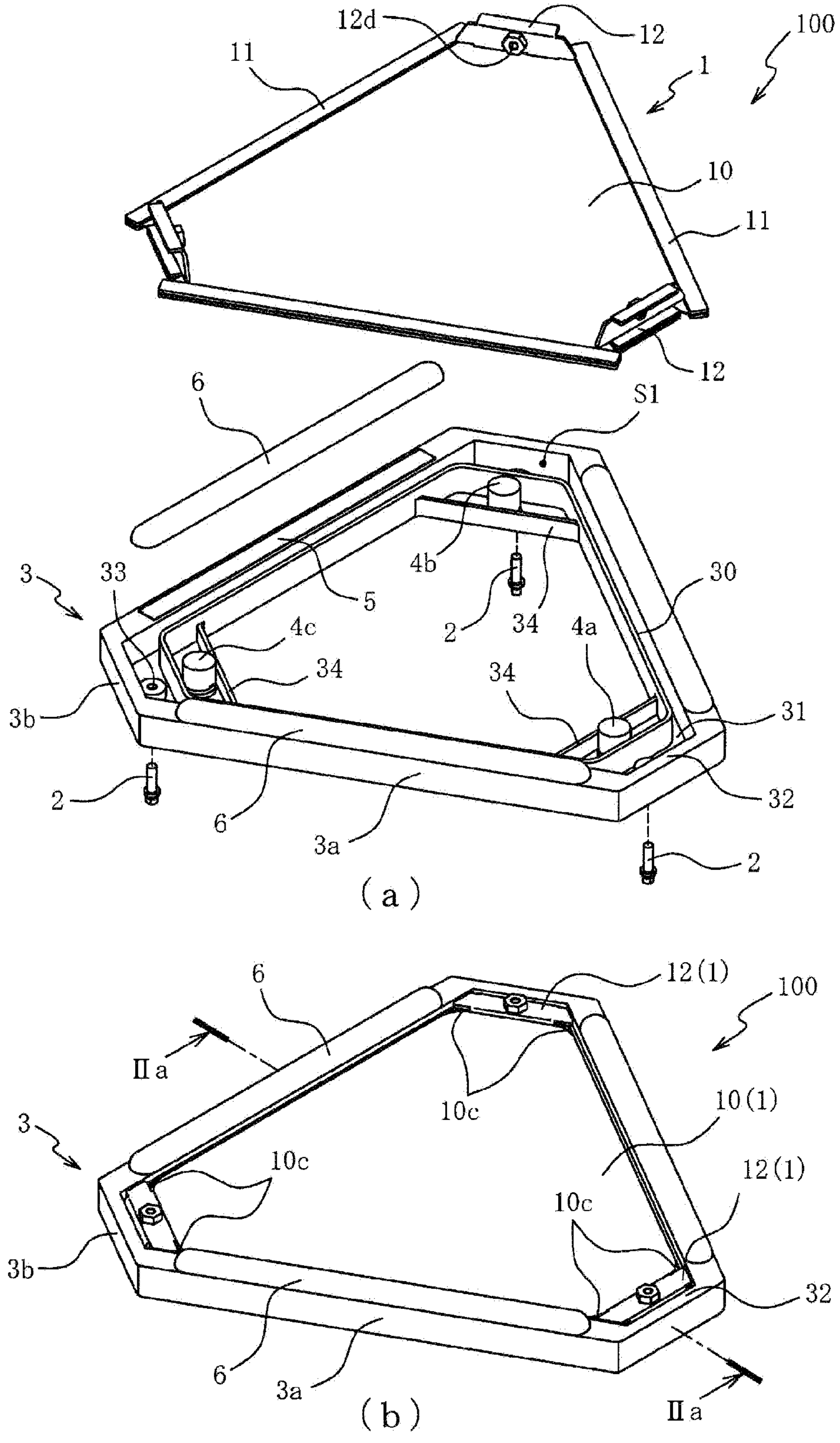
In FIG. 1, (a) is an exploded perspective view illustrating a percussion instrument according to a first embodiment, and (b) is a perspective view of the percussion instrument.
Figure 2:
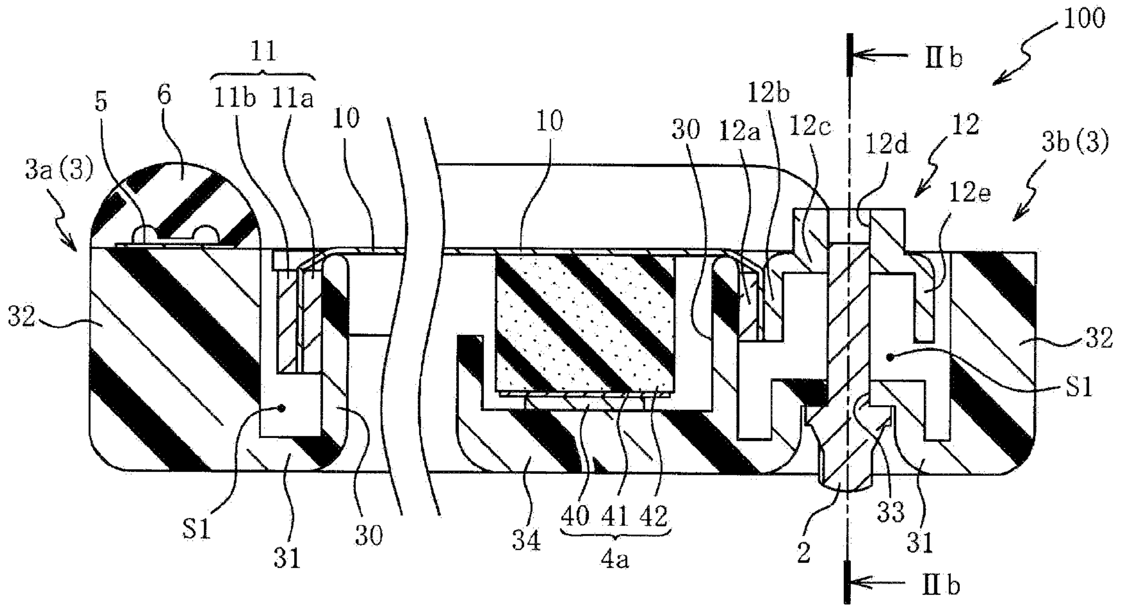
In FIG. 2, (a) is a partially enlarged cross-sectional view of the percussion instrument taken along a line IIa-IIa in (b) of FIG. 1, and (b) is a partially enlarged cross-sectional view of the percussion instrument taken along a line IIb-IIb in (a) of FIG. 2.
Figure 2:
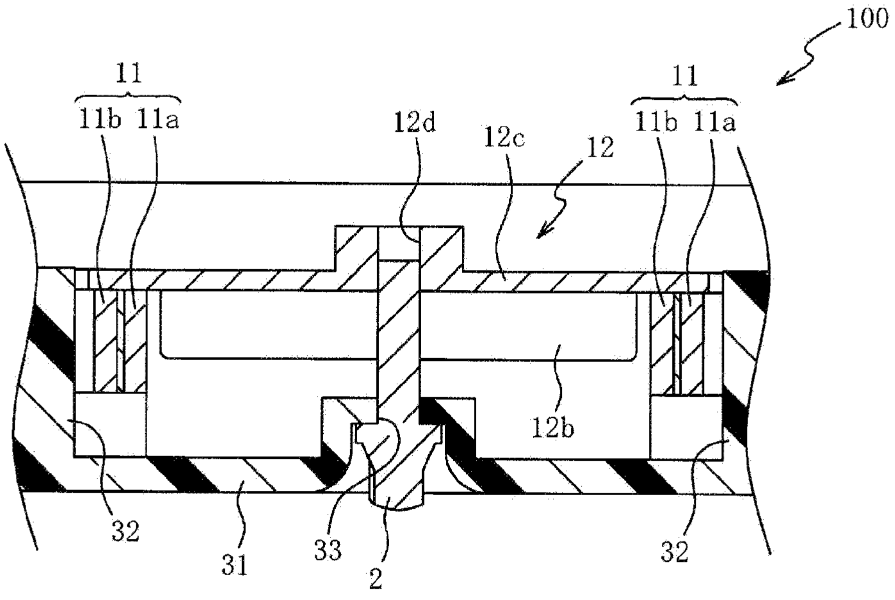

In the following, several embodiments will be described with reference to the drawings. Firstly, referring to FIGS. 1 and 2, a percussion instrument 100 according to a first embodiment is described. In FIG. 1, (a) is an exploded perspective view illustrating the percussion instrument 100 according to the first embodiment, and (b) is a perspective view of the percussion instrument 100. In FIG. 2, (a) is a partially enlarged cross-sectional view of the percussion instrument 100 taken along a line IIa-IIa in (b) of FIG. 1, and (b) is a partially enlarged cross-sectional view of the percussion instrument 100 taken along a line IIb-IIb in (a) of FIG. 2. In (a) and (b) of FIG. 2, for the ease of understanding, only main components in the cross-sections of the percussion instrument 100 are shown (the same applies to the cross-sectional view of the second to fourth embodiments described to be described afterwards).

As shown in FIGS. 1 and 2, the percussion instrument 100 is a percussion instrument in a polygonal shape. A drumhead 1 is installed to the percussion instrument 100, and an upper surface of a membrane 10 of the drumhead 1 serves as a striking surface to be struck by a performer.

The membrane 10 is formed in a polygonal shape (a hexagon, according to the embodiment) formed by using a mesh in which synthetic fibers are knitted. The respective sides of the polygonal membrane 10 are formed by three long sides that are longer and three short sides shorter than the long sides. The lengths of the three long sides are the same, and the lengths of the three short sides located between the long sides are also the same.

A long-side frame body 11 extending along the long side is fixed to each of the long sides of the membrane 10, and a short-side frame body 12 extending along the short side is fixed to each of the short sides of the membrane 10. That is, multiple (six in the embodiment) ones of the long-side frame bodies 11 and the short-side frame bodies 12 are provided side-by-side along the outer edge of the membrane 10.

The long-side frame body 11 is formed by a pair of fixing frames 11*a* and 11*b* (see (a) and (b) of FIG. 2) that are plate-like. By bonding the fixing frames 11*a* and 11*b* sandwiching the edge of the long side of the membrane 10 to each other, the long-side frame body 11 is fixed to the outer edge of the membrane 10.

The short-side frame body 12 includes a pair of fixing frames 12*a*, 12*b* (see (a) of FIG. 2) that are plate-like. By bonding the fixing frames 12*a* and 12*b* sandwiching the edge of the short side of the membrane 10, each short-side frame body 12 is fixed to the outer edge of the membrane 10.

The membrane 10 is formed by using a mesh-like material (e.g., a mesh formed by knitting synthetic fibers). Therefore, in the case where the fixing frames 12*a* and 12*b* of the short-side frame body 12 (the fixing frames 11*a* and 11*b* of the long-side frame body 11) are adhered to each other by using an adhesive, the adhesive permeates the mesh of the membrane 10. Accordingly, the short-side frame body 12 (the long-side frame body 11) can be firmly adhered to the membrane 10.

Accordingly, by adhering the fixing frames 12*a* and 12*b* (fixing frames 11*a*, 11*b*) sandwiching the outer edge of the mesh-like membrane 10 to be fixed to the membrane 10, the manufacturing cost of the drumhead 1 can be reduced, as compared to the case where a frame body made of resin is integrally formed with the membrane 10 through molding.

A plate-like engagement frame 12*c* (see (a) and (b) of FIG. 2) is integrally formed at the upper end of the fixing frame 12*b* of the short-side frame body 12, and a female screw hole 12*d* for a bolt 2 to be screwed into is formed at the center of the engagement frame 12*c* in the longitudinal direction. In addition, a plate-like reinforcement frame 12*e* opposite to the fixing frame 12*b* is integrally formed with the engagement frame 12*c*, and a "⊐"-shaped (U-shaped) frame, when viewed in a cross-sectional view, is formed by the fixing frame 12*b*, the engagement frame 12*c*, and the reinforcement frame 12*e*.

An annular frame 3 to which the drumhead 1 is installed includes a support part 30 supporting the membrane 10 from a lower part, a bottom part 31 forming a bottom surface of a holding space S1 for the long-side frame bodies 11 and the short-side frame bodies 12, and a wall part 32 forming a wall on the outer peripheral side of the holding space S1. In addition, the support part 30, the bottom part 31, and the wall part 32 are respectively formed integrally.

The support part 30 is a part forming an inner edge portion of the frame 3. In addition, the membrane 10 is supported by the upper end portion of the support part 30 extending in the upper-lower direction. The bottom part 31 extends from a lower part of the support part 30 to an outer peripheral side, and the wall part 32 protruding upward from the bottom part 31 is opposite to the support part 30 with the holding space S1 sandwiched therebetween. The groove-shaped holding space S1 surrounded by the support part 30, the bottom part 31, and the wall part 32 is continuous throughout the entire periphery of the frame 3 (see (a) of FIG. 1).

In addition, the frame 3 is formed in a polygonal shape (hexagon in the embodiment) corresponding to the shape of the drumhead 1, and the holding space S1 formed by the support part 30, the bottom part 31, and the wall part 32 of the frame 3 is also formed in a polygonal shape into which the respective frame bodies 11 and 12 of the drumhead 1 are insertable.

Accordingly, since the frame 3 is formed in a shape corresponding to the membrane 10 of the drumhead 1, long-side portions and short-side portions are also formed in the frame 3. In the following description, the long-side portion of the frame 3 is labeled as a long-side frame 3*a*, and the short-side portion of the frame 3 is labeled as a short-side frame 3*b*.

At the bottom part 31 of each short-side frame 3*b*, a through hole 33 for insertion of the bolt 2 is formed. At the time of installing the drumhead 1 to the frame 3, each of the long-side frame bodies 11 and the short-side frame bodies 12 is folded downward to be inserted into the holding space S1, and the bolt 2 inserted into the through hole 33 in such state is screwed into the female screw hole 12*d* of the short-side frame body 12. Accordingly, each short-side frame body 12 is pulled downward.

At this time, each long-side frame body 11 is pressed downward by each short-side frame body 12. This is because the two ends of the engagement frame 12*c* of the short-side frame body 12 in the longitudinal direction (the left-right direction in (b) of FIG. 2) protrude over the fixing frames 12*a* and 12*b* and the reinforcement frame 12*e*, and such protrusion portions serve to overlap with the two ends of each long-side frame body 11 on the two ends in the longitudinal direction (see (b) of FIG. 2). Accordingly, each long-side frame body 11 is also pulled downward by the force pressing each short-side frame body 12. Thus, tension is applied to the entirety of the membrane 10 through the respective frame bodies 11 and 12.

In this way, in the embodiment, it is configured that the frame body fixed to the membrane 10 is divided into multiple long-side frame bodies 11 and short-side frame bodies 12 aligned along the peripheral direction, and tension is applied to the membrane 10 by pulling each of the respective frame bodies 11 and 12. Accordingly, it is not necessary to make the shape of each of the frame bodies 11 and 12 consistent with the frame 3 in a complicated polygonal shape, and the shape of each of the frame bodies 11 and 12 can be formed as a linear shape. Therefore, the shape of each of the frame bodies 11 and 12 hardly varies. In addition, even if the shape of each of the frame bodies 11 and 12 varies, tension can be uniformly applied to the membrane 10, as it is configured that each of the frame bodies 11 and 12 is pulled to apply tension to the membrane 10.

In addition, since the short-side frame body 12 is made of metal, the short-side frame body 12 can be suppressed from bending when being pulled by screwing the bolt 2. In addition, the engagement frame 12*c* of the short-side frame body 12 is reinforced by the fixing frames 12*a* and 12*b* and the reinforcement frame 12*e*. Therefore, the bending of the short-side frame body 12 can also be suppressed. In this way, by suppressing the bending of the short-side frame body 12, the tension of the membrane 10 in the vicinity of the short-side frame body 12 can be prevented from being loosened. Therefore, tension can be uniformly applied to the membrane 10.

Here, according to the second embodiment (see (a) and (b) of FIG. 3) to be described in the following, tension can be applied to the membrane 10 by screwing the bolt 2 to each of long-side frame bodies 211 and short-side frame bodies 212 divided in the peripheral direction. However, in such configuration, the number of bolts 2 (the number of parts) increases, and it takes time and effort to screw the bolts 2.

Comparatively, in the embodiment and as described above, two ends of the engagement frame 12*c* of each short-side frame body 12 are overlapped with respect to the multiple long-side frame bodies 11 aligned along the peripheral direction. Therefore, tension can be applied to the membrane 10 by screwing the bolt 2 into the short-side frame body 12. Accordingly, compared with the configuration in which the bolt 2 is screwed into each of the frame bodies 11 and 12, the number of parts can be reduced, and the time and effort required to screw the bolts 2 can be reduced.

Moreover, for example, it is also possible to overlap the two ends of the long-side frame body 11 with the short-side frame bodies 12 (engagement frames 12*c*) on the short-side frame bodies 12 and screw the bolts 2 into the long-side frame bodies 11 to apply tension to the membrane 10. However, since the long-side frame body 11 is formed to be longer, when it is configured to screw one bolt 2 to the center of the long-side frame body 11, for example, the long-side frame body 11 may be bent, and the respective two adjacent short-side frame bodies 12 cannot be pressed uniformly. In order to suppress the bending of the long-side frame body 11, it is necessary to screw the bolts 2 to multiple places (e.g., two places) of the long-side frame body 11 in the longitudinal direction. Thus, the number of parts increases, and it takes time and effort to screw the bolts 2.

Comparatively, in the embodiment, it is configured that the long-side frame bodies 11 are pressed by screwing the bolts 2 into the short-side frame bodies 12 that are shorter. Accordingly, even in the configuration in which one bolt 2 is screwed into the center of the short-side frame body 12, the bending of the short-side frame body 12 can be suppressed. Thus, the respective two adjacent long-side frame bodies 11 can be uniformly pressed. Accordingly, the time and effort for screwing the bolts 2 can be saved, and tension can be uniformly applied to the membrane 10, while the number of parts can be reduced.

On the lower surface side of the membrane 10, multiple striking surface sensors 4*a* to 4*c* for detecting striking on the membrane body 1 are provided (see (a) of FIG. 1 for the striking surface sensors 4*b* and 4*c*), and the striking surface sensors 4*a* to 4*c* are supported by sensor support parts 34 with L-shaped cross-sections. The sensor support part 34 is integrally formed with the inner peripheral surface of the short-side frame 3*b* and the inner peripheral surface of the long-side frame 3*a* adjacent to such short-side frame 3*b*, and is provided at each of the three corners (corner portions of three places) of the frame 3 in a polygonal shape.

The striking surface sensors 4*a* to 4*c* include disc-shaped two-sided tapes 40 bonded to the upper surface of the sensor support parts 34. The two-side tape 40 has a cushion property, and a sensor 41, which is a disc-shaped piezoelectric element, is bonded to the upper surface of the two-side tape 40. A cushion 42 in a cylindrical shape is bonded to the upper surface of the sensor 41. The cushion 42 is formed by using sponge. With the cushion 42 contacting the lower surface of the membrane 10, the vibration at the time when the upper surface (striking surface) of the membrane 10 is struck is transmitted to the sensor 41 via the cushion 42.

In addition, a sheet sensor 5 extending in the longitudinal direction of the long-side frame 3*a* is bonded to the upper surface of the wall part 32 of the long-side frame 3*a*. The sheet sensor 5 is a strip-shaped pressure sensor which detects a pressure change (or ON/OFF). A cover 6 having a semi-circular cross-section and extending in the longitudinal direction of the long-side frame 3*a* is bonded to the upper surface of the sheet sensor 5.

The cover 6 is formed by using a rubber-like elastic body. When the cover 6 is struck, the sheet sensor 5 detects a pressure according to deformation of the cover 6. The striking detection results of the striking surface sensors 4*a* to 4*c* (sensors 41) and the sheet sensors 5 are output to a sound source (not shown), and a musical sound signal is generated by the sound source based on the striking detection results. By outputting an electronic sound based on the generated musical sound signal to an amplifier or a speaker (neither of which is shown), an electronic musical sound in accordance with the musical sound signal is emitted from the amplifier or the speaker.

Accordingly, by striking the membrane 10 or the wall part 32 (the cover 6), a performance simulating a head-only shot (striking only the membrane 10), a rim shot (striking both the membrane 10 and the wall part 32), and a rim-only shot (striking only the wall part 32) can be carried out.

The striking surface sensors 4*a* to 4*c* are provided at three places on the peripheral edge side of the membrane 10. A striking location is determined based on the detection results of the three striking surface sensors 4*a* to 4*c*, and different musical sounds are generated in accordance with the striking location. Regarding the determination on the striking location, it is possible to adopt conventional technologies. For example, a configuration of detecting a striking location based on a peak difference or ratio of output values of the respective striking surface sensors 4*a* to 4*c* (e.g., Japanese Laid-open No. S62-501653) and a configuration of detecting a striking location based on a difference in the time at which the striking (vibration) is detected at the respective striking surface sensors 4*a* to 4*c* (e.g., Japanese Laid-open No. H05-232943) are exemplified.

That is, among the respective striking surface sensors 4*a* to 4*c*, in the case where the vicinity of the striking surface sensor 4*a* is struck, a musical sound is generated, and, comparatively, in the case where the vicinity of the striking surface sensor 4*b* is struck, another musical sound with a different tone is generated. In addition, in the case where the vicinity of the striking surface sensor 4*c* is struck, a musical sound different from the musical sounds generated when the vicinities of the striking surface sensors 4*a* and 4*b* are struck is generated.

Likewise, at the time when the sheet sensors 5 at three places are detected as struck, different musical sounds are generated in accordance with the sheet sensor 5 detecting the striking. That is, in the embodiment, a total of six types of musical sounds are generated. The six types of musical sounds are: three types of musical sounds through striking detection at the respective striking surface sensors 4*a* to 4*c* and three types of musical sounds through striking detection at the respective sheet sensors 5. Accordingly, the performance using the percussion instrument 100 can be more variable.

Thus, the striking surface sensors 4*a* to 4*c* are arranged in the vicinities of respective vertexes 10*c* (see (b) of FIG. 1) of the polygonal membrane 10 (the inner edge of the frame 3) in the embodiment, so that different musical sounds are generated in accordance with the striking location detected by the respective striking surface sensors 4*a* to 4*c*. Thus, these musical sounds can be easily split evenly. Accordingly, different musical sounds can be generated by splitting evenly the vicinities of the corners at the three places of the membrane 10. That is, the performer can easily recognize which musical sound is to be generated by striking which area on the upper surface (striking surface) of the membrane 10. Therefore, different musical sounds can be split easily.

In addition, since the respective striking surface sensors 4*a* to 4*c* are provided in the vicinities of the vertexes 10*c* of the membrane 10, the striking surface sensors 4*a* to 4*c* can be provided at locations away from the centers of the long-side frames 3*a* in the longitudinal direction, i.e., locations away from the centers of the covers 6. In this way, it is difficult to detect the vibration at the time of striking the centers of the covers 6 (areas that are more easily struck) by using the respective striking surface sensors 4*a* to 4*c*. Therefore, whether the membrane 10 or any of the covers 6 is struck can be accurately determined.

It is noted that the vicinities of the vertexes 10*c* of the membrane 10 are areas on the outer side with respect to a hypothetical circle defined as an inscribed circle contacting the outer edge of the polygonal membrane 10 (the inner edge of the frame 3), for example. Thus, "the striking surface sensors 4*a* to 4*c* are provided in the vicinities of the vertexes 10*c* of the membrane 10" indicates that, when the percussion instrument 100 is viewed from a top perspective, the centers of the respective striking surface sensors 4*a* to 4*c* are located on the outer side with respect to the hypothetical circle.

Figure 3:
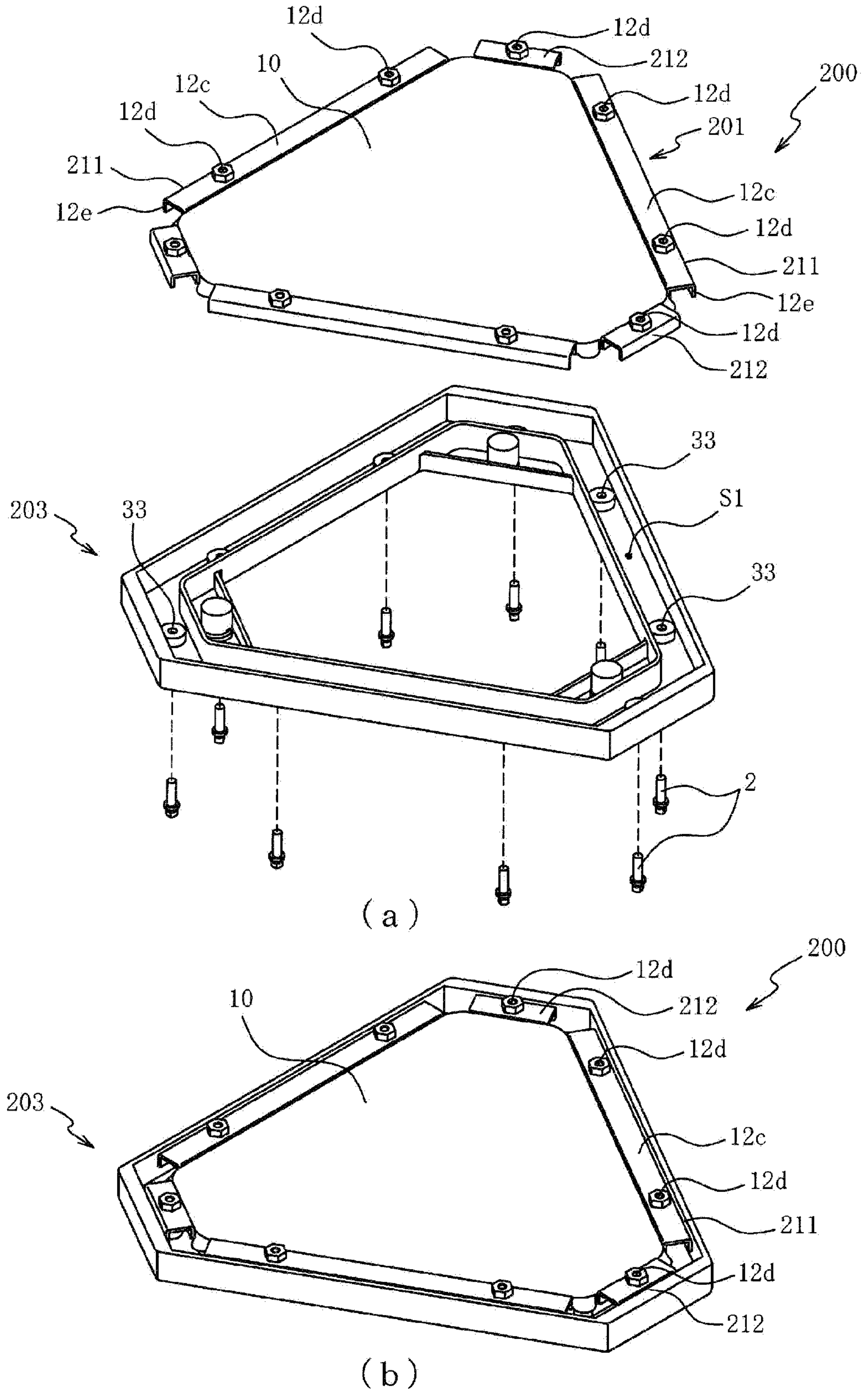
In FIG. 3, (a) is an exploded perspective view illustrating a percussion instrument according to a second embodiment, and (b) is a perspective view of the percussion instrument.

Then, referring to (a) and (b) of FIG. 3, a percussion instrument 200 according to a second embodiment is described. In the first embodiment, the bolts 2 are only screwed into the short-side frame bodies 12. However, in the embodiment, the bolts 2 are also screwed into the long-side frame bodies 211. It is noted that parts same as the first embodiment are labeled with the same symbols, and the descriptions thereof are omitted. In FIG. 3, (a) is an exploded perspective view illustrating the percussion instrument 200 according to the first embodiment, and (b) is a perspective view of the percussion instrument 200.

As shown in (a) and (b) of FIG. 3, a drumhead 201 of the percussion instrument 200 of the second embodiment includes the long-side frame bodies 211 and the short-side frame bodies 212. In the long-side frame body 211, a configuration equivalent to the engagement frame 12*c*, the female screw hole 12*d*, and the reinforcement frame 12*e* is added to the long-side frame body 11 of the first embodiment. In addition, except for the point that the short-side frame body 212 is not provided with the portion overlapped with the adjacent long-side frame bodies 211 on the long-side frame bodies 211, the short-side frame body 212 has the same configuration as the short-side frame body 12 of the first embodiment.

In the long-side frame body 211, the female screw holes 12*d* are formed at multiple places (two places in the embodiment) in the longitudinal direction of the long-side frame body 211. Except for the point that the through holes 33 are also formed at the locations corresponding to the female screw holes 12*d* of the long-side frame body 211, a frame 203 has the same configuration as the frame 3 of the first embodiment.

Accordingly, by inserting each of the long-side frame bodies 211 and the short-side frame bodies 212 into the holding space S1 and, in such state, screwing the bolts 2 inserted into the through holes 33 of the frame 203 into the female screw holes 12*d*, the respective long-side frame bodies 211 and short-side frame bodies 212 are pulled downward. Accordingly, through the respective long-side frame bodies 211 and short-side frame bodies 212, tension can be applied to the entirety of the membrane 10.

In this way, in the embodiment as well, it is not necessary for the respective frame bodies 211 and 212 to form a complicated polygonal shape, and the respective frame bodies 211 and 212 can be formed in linear shapes. Therefore, the shapes of the frame bodies 211 and 212 hardly vary. In addition, even if the shapes of the frame bodies 211 and 212 vary, since it is configured that each of the frame bodies 211 and 212 is pulled to apply tension to the membrane 10, tension can be uniformly applied to the membrane 10.

Figure 4:
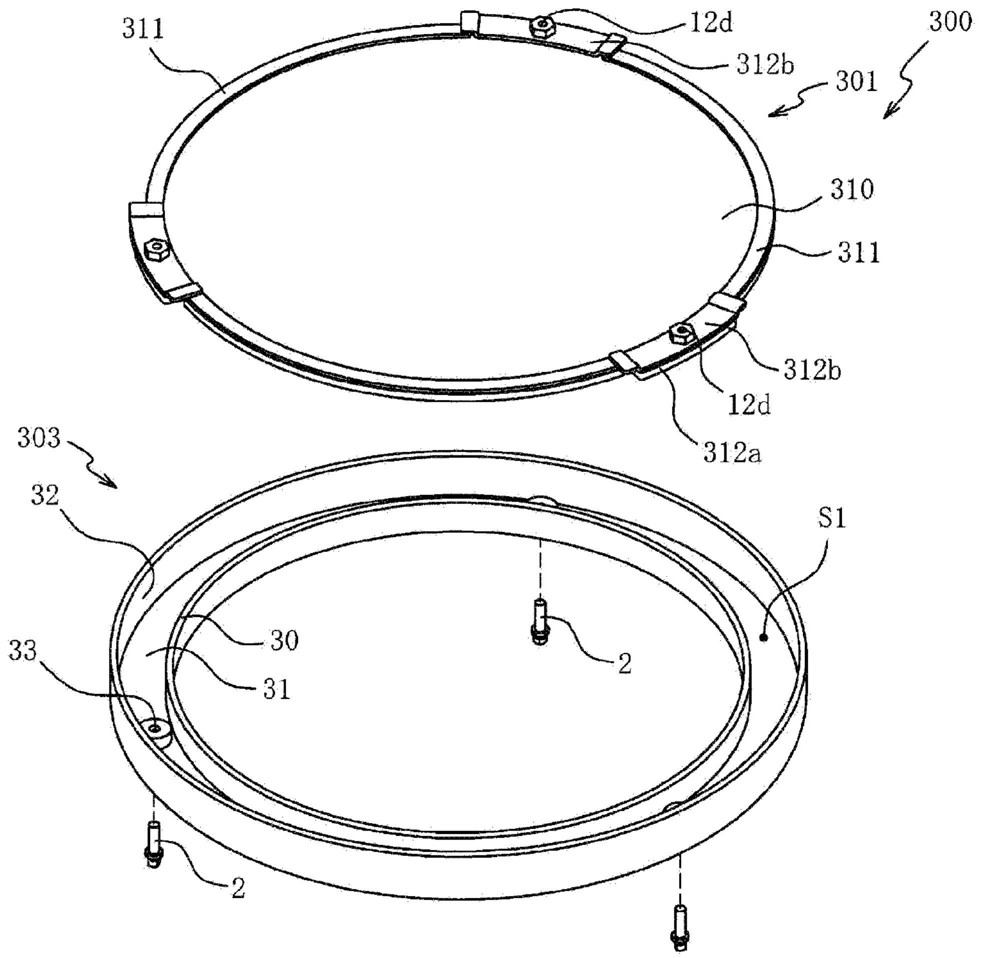
In FIG. 4, (a) is an exploded perspective view illustrating a percussion instrument according to a third embodiment, and (b) is a perspective view of the percussion instrument.
Figure 4:
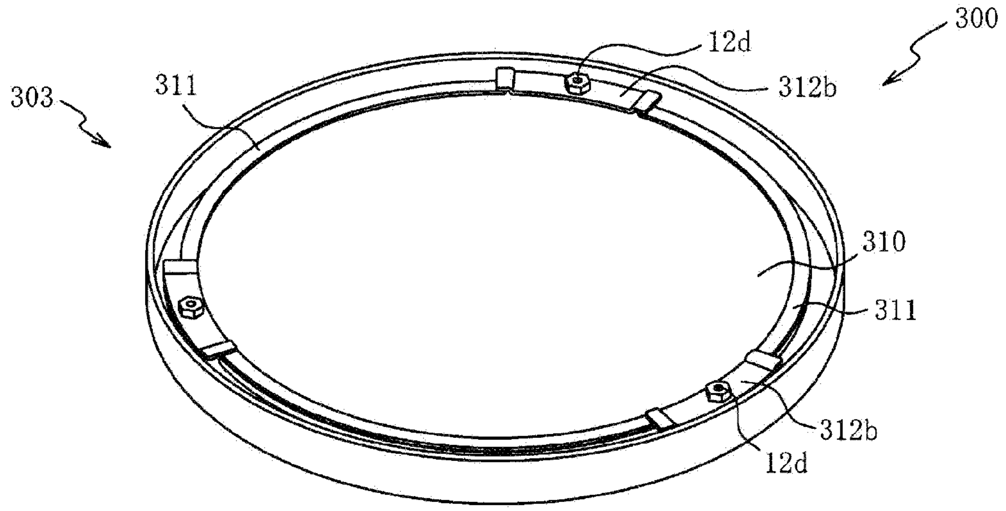

Then, referring to (a) and (b) of FIG. 4, a percussion instrument 300 according to a third embodiment is described. In the first embodiment, the frame 3 and the membrane 10 are formed to be polygonal. However, in the third embodiment, a frame 303 and a membrane 310 are formed to be arc. It is noted that parts same as the first embodiment are labeled with the same symbols, and the descriptions thereof are omitted. In FIG. 4, (a) is an exploded perspective view illustrating the percussion instrument 300 according to the third embodiment, and (b) is a perspective view of the percussion instrument 300.

As shown in (a) and (b) of FIG. 4, the percussion instrument 300 according to the third embodiment does not include the striking surface sensors 4*a* to 4*c* and the sheet sensors 5. In the drumhead 301 installed to the percussion instrument 300, an arc frame body 311 and arc frame bodies 312*a* and 312*b* are connected to an outer edge of the arc membrane 310. The arc frame body 311 is one that forms the long-side frame body 11 of the first embodiment in an arc shape. In addition, the arc frame bodies 312*a* and 312*b* are ones that omit the engagement frame 12*c* and the reinforcement frame 12*e* of the short-side frame body 12 of the first embodiment and form the fixing frames 12*a* and 12*b* in an arc shape, and have the female screw hole 12*d* formed at the center of the arc frame bodies 312*a* and 312*b*.

The frame 303 has the same configuration as the frame 3 of the first embodiment except for the point of being arc in shape, and includes a configuration equivalent to the support part 30, the bottom part 31, and the wall part 32 (the holding space S1). In addition, at the bottom part 31 of the frame 303, the through holes 33 are formed at locations corresponding to the female screw holes 12*d* of the arc frame bodies 312*a* and 312*b*.

When the drumhead 301 is installed to the frame 303, in the state in which the arc frame bodies 311 and the arc frame bodies 312*a* and 312*b* are inserted into the holding space S1, the bolts 2 inserted into the through holes 33 are screwed into the female screw holes 12*d* of the arc frame bodies 312*a* and 312*b*. Accordingly, each of the arc frame bodies 312*a* and 312*b* is pulled downward.

At this time, since two ends of each arc frame body 312*b* are overlapped with the arc frame bodies 311 on the arc frame bodies 311, the respectively arc frame bodies 311 are pressed downward by the arc frame bodies 312*a* and 312*b*. Accordingly, since the arc frame bodies 311 are also pulled downward, tension can be applied to the entirety of the membrane 310 of the drumhead 301.

In this way, in the embodiment as well, it is configured to apply tension to the membrane 310 by pulling each of the arc frame bodies 311 and the arc frame bodies 312*a* and 312*b*. Therefore, even if the arc frame bodies 311 and the arc frame bodies 312*a* and 312*b* have variations, tension can be uniformly applied to the membrane 310.

Then, referring to FIGS. 5 to 8, a percussion instrument 400 according to a fourth embodiment is described. In the first embodiment, the long-side frames 3*a* and the short-side frames 3*b* of the frame 3 are integrally formed. However, in the fourth embodiment, long-side frames 403*a* and short-side frames 403*b* are formed separately. It is noted that parts same as the first embodiment are labeled with the same symbols, and the descriptions thereof are omitted.

Figure 5:
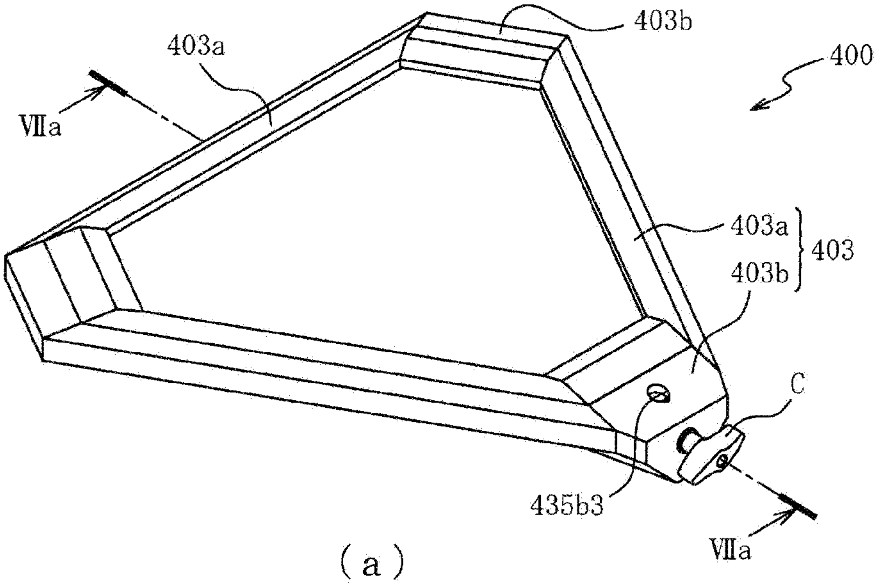
In FIG. 5, (a) is a perspective view illustrating a percussion instrument according to a fourth embodiment, and (b) is a partially enlarged perspective view of the percussion instrument illustrating a state in which a long-side frame is installed to a long-side frame body.
Figure 5:
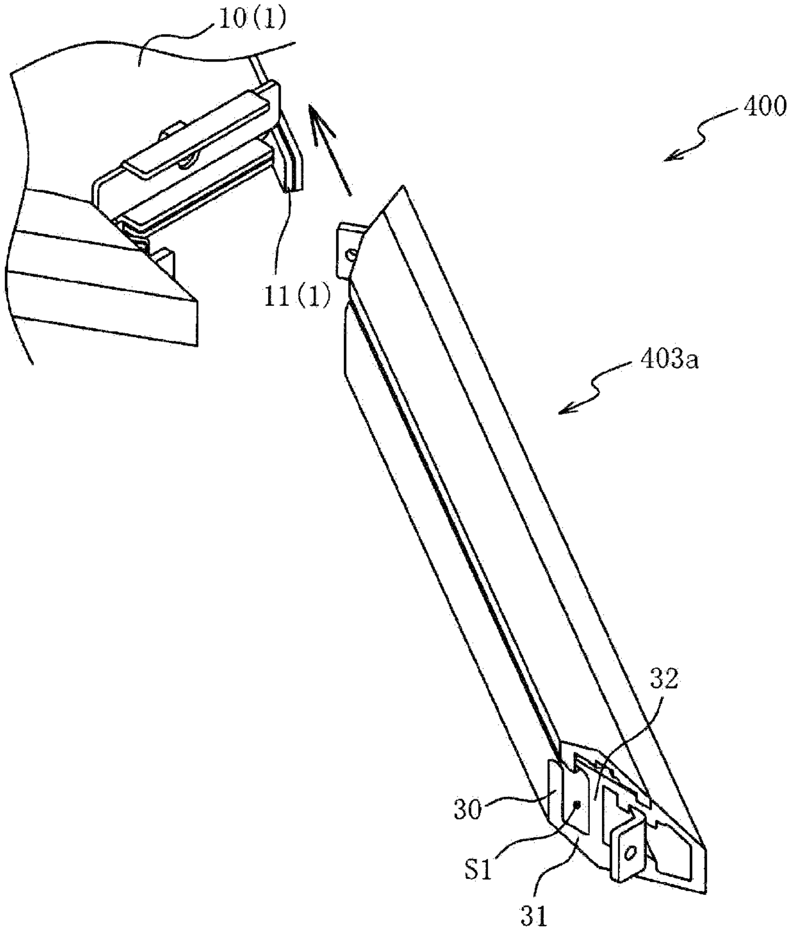
Figure 6:
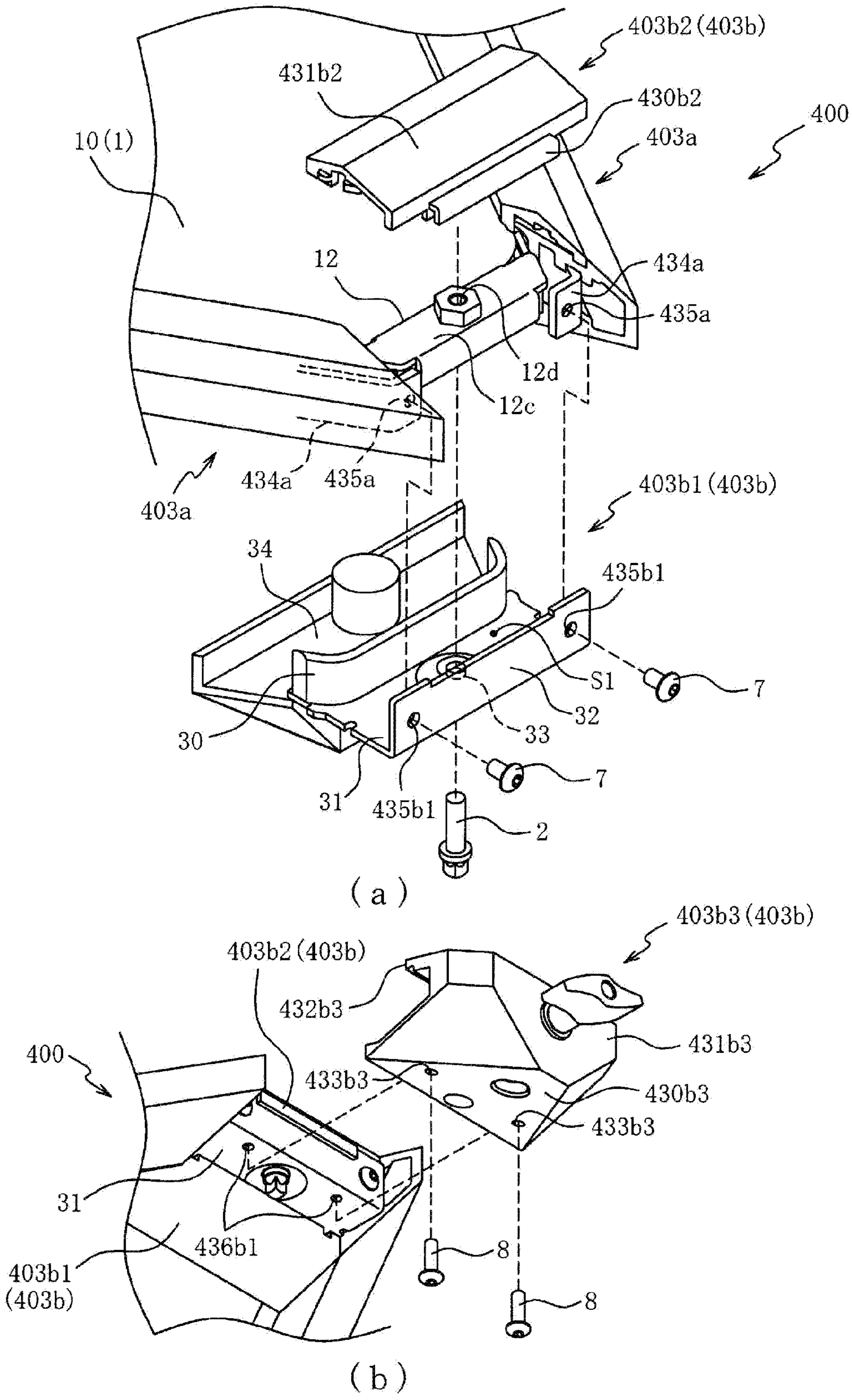
In FIG. 6, (a) is a partially enlarged perspective view of the percussion instrument illustrating a state in which a support frame and an upper frame are installed to a short-side frame body, and (b) is a partially enlarged perspective view of the percussion instrument illustrating a state in which a side frame is installed to the support frame and the upper frame.

Firstly referring to (a) and (b) of FIG. 5 and (a) and (b) of FIG. 6, the configuration and the assembling method of the percussion instrument 400 are described. In FIG. 5, (a) is a perspective view illustrating the percussion instrument 400 according to the fourth embodiment, and (b) is a partially enlarged perspective view of the percussion instrument 400 illustrating a state in which the long-side frame 403*a* is installed to the long-side frame body 11. In FIG. 6, (a) is a partially enlarged perspective view of the percussion instrument 400 illustrating a state in which a support frame 403*b*1 and an upper frame 403*b*2 are installed to the short-side frame body 12, and (b) is a partially enlarged perspective view of the percussion instrument 400 illustrating a state in which a side frame 403*b*3 is installed to the support frame 403*b*1 and the upper frame 403*b*2.

As shown in (a) and (b) of FIG. 5, in the frame 403 of the percussion instrument 400 of the fourth embodiment, long-side frames 403*a* and short-side frames 403*b* are divided in the peripheral direction. The drumhead 1 (see (b) of FIG. 5) to which the long-side frames 403*a* and the short-side frames 403*b* are installed is the same as the drumhead 1 (see (a) of FIG. 1) of the first embodiment. In the following description, the configuration of the short-side frame 403*b* in which a through hole 435*b*3 (to be described afterwards) is formed (and to which a clamp C is installed) among the short-side frames 403*b* is described. However, except for the presence/absence of the through hole 435*b*3, the configurations of the respective short-side frames 403*b* are the same.

As shown in (b) of FIG. 5, the long-side frame 403*a* includes a configuration equivalent to the support part 30, the bottom part 31, and the wall part 32 (the holding space S1). In the holding space S1 of the long-side frame 403*a,* the two end sides of the long-side frame 403*a* in the longitudinal direction are open. Accordingly, by inserting the long-side frame body 11 from the end part of the holding space S1, the long-side frame 403*a* is installed to the drumhead 1 (the long-side frame body 11 is held in the holding space S1).

Then, as shown in (a) of FIG. 6, the short-side frame body 12 located between the respective long-side frames 403*a* is sandwiched, in an upper-lower direction, by the support frame 403*b*1 and the upper-side frame 403*b*2 of the short-side frame 403*b*.

Specifically, the support frame 403*b*1 includes a configuration equivalent to the support part 30, the bottom part 31, the wall part 32, the through hole 33, and the sensor support part 34. The upper side of the holding space S1 formed by the support part 30, the bottom part 31, and the wall part 32 of the support frame 403*b*1 is open. Accordingly, by fitting the support frame 403*b*1 between the ends of the respective long-side frames 403*a* from a lower part, the short-side frame body 12 is held in the holding space S1 of the support frame 403*b*1.

Through holes 435*b*1 for insertion of bolts 7 are formed on the two end sides of the wall part 32 of the support frame 403*b*1 in the peripheral direction, and connection parts 434*a* for the bolts 7 to be screwed through are formed in the respective long-side frames 403*a*. The connection parts 434*a* are plate-shaped bodies bent from the two ends of the long-side frame 403*a* in the longitudinal direction toward the inner peripheral side, and screw holes 435*a* are formed at the connection parts 434*a*.

Accordingly, in the state in which the support frame 403*b*1 is fit between the ends of the long-side frames 403*a,* the bolts 7 inserted into the through holes 435*b*1 are screwed into the female screw holes 435*a,* thereby connecting the support frame 403*b*1 to the long-side frames 403*a*. While not shown in the drawings, in such connection state, the respective support parts 30 (see (b) of FIG. 5 for the support part 30 of the long-side frame 403*a*) of the long-side frames 403*a* and the support frames 403*b*1 are configured to be linked in an annular shape.

Then, in the state in which the support frame 403*b*1 is connected to the long-side frames 403*a,* the bolt 2 inserted into the through hole 33 of the support frame 403*b*1 is screwed into the female screw hole 12*d* of the short-side frame body 12. Accordingly, each short-side frame body 12 is pulled to the lower side.

Figure 7:
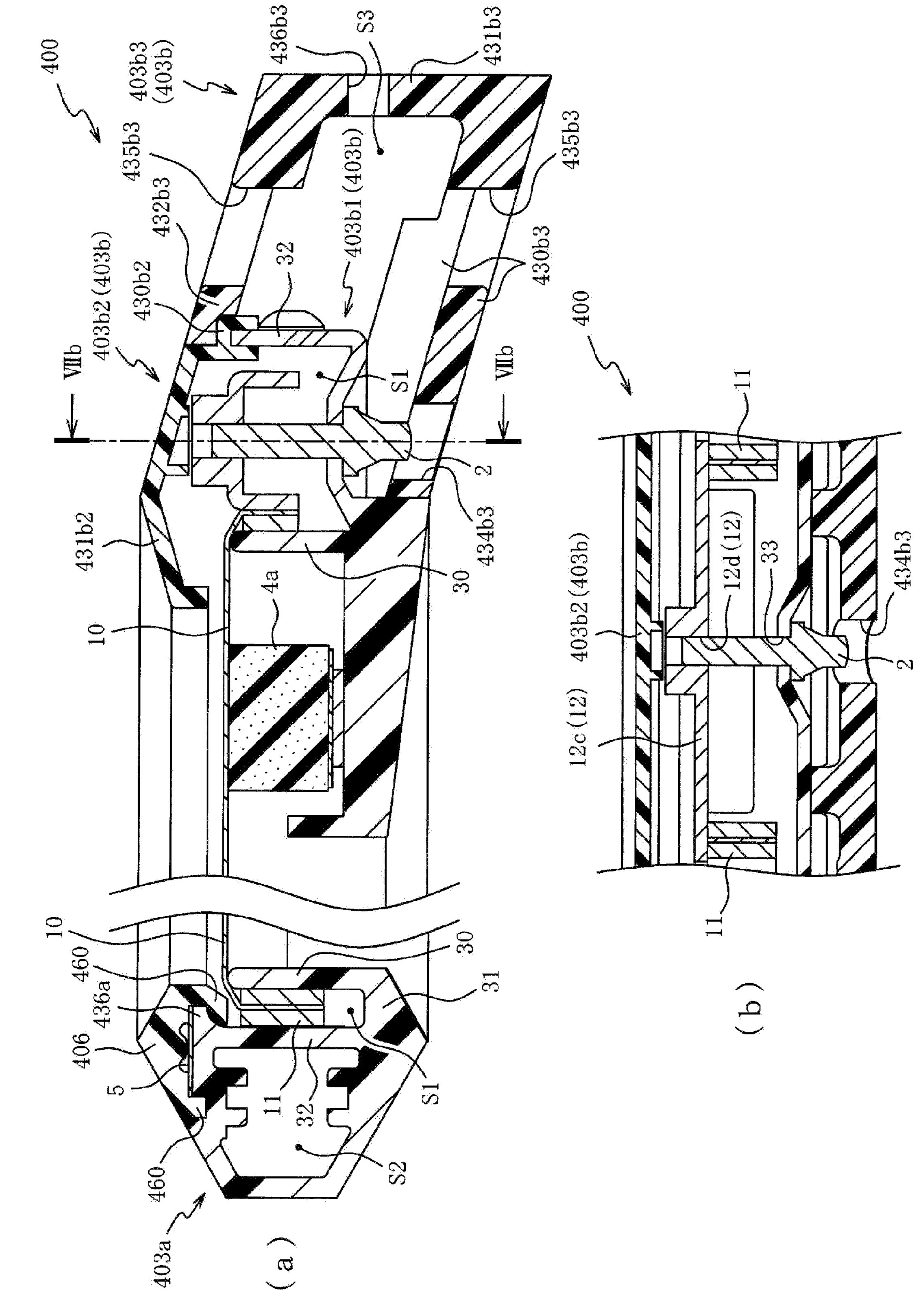
In FIG. 7, (a) is a partially enlarged cross-sectional view of the percussion instrument taken along a line VIIa-VIIa in (a) of FIG. 5, and (b) is a partially enlarged cross-sectional view of the percussion instrument taken along a line VIIb-VIIb in (a) of FIG. 7.

At this time, like the first embodiment, since two ends of the engagement frame 12*c* of the short-side frame body 12 is overlapped with the long-side frame bodies 11 (see (b) of FIG. 7), the respective long-side frame bodies 11 are pressed downward. Accordingly, tension can be applied to the entirety of the membrane 10. In this way, in the embodiment as well, it is not necessary for the respective frame bodies 11 and 12 to form a complicated polygonal shape, and the respective frame bodies 11 and 12 can be formed in linear shapes. Therefore, the shapes of the frame bodies 11 and 12 hardly have variation. In addition, even if the shape of each of the frame bodies 11 and 12 varies, tension can be uniformly applied to the membrane 10, as it is configured that each of the frame bodies 11 and 12 is pulled to apply tension to the membrane 10.

Since the upper-side frame 403*b*2 includes a fixed part 430*b*2 in a "⊐" shape (U-shape) when viewed in a cross-sectional view, by hooking the fixed part 430*b*2 to the wall part 32 of the support frame 403*b*1, the upper-side frame 403*b*2 is installed to the support frame 403*b*1.

A covering part 431*b*2 extending from the fixed part 430*b*2 (the wall part 32 of the support frame 403*b*1) to the inner peripheral side is formed at the upper-side frame 403*b*2. Since the covering part 431*b*2 can cover the upper side of the short-side frame body 12, the appearance of the percussion instrument 400 can be favorable.

Then, as shown in (b) of FIG. 6, the side frame 403*b*3 is fit with the support frame 403*b*1 to which the upper-side frame 403*b*2 is installed from the outer peripheral side. The side frame 403*b*3 is a frame in a "⊐" shape (U-shape) when viewed in a cross-sectional view and is formed by a lower part 430*b*3 covering the bottom part 31 of the support frame 403*b*1 from a lower part, a side part 431*b*3 extending upward from an outer edge of the lower part 430*b*3, and an upper part 432*b*3 protruding from the upper end of the side part 431*b*3 toward the inner peripheral side to be opposite to the lower part 430*b*3 in the upper-lower direction.

Multiple (two in the embodiment) through holes 433*b*3 are formed at the lower part 430*b*3 of the side frame 403*b*3, and screw holes 436*b*1 are formed at locations corresponding to the through holes 433*b*3 in the bottom part 31 of the support frame 403*b*1. Accordingly, by screwing the bolts 8 inserted into the through holes 433*b*3 into the female screw holes 436*b*1, the side frame 403*b*3 is fixed to the support frame 403*b*1. Accordingly, the assembling of the percussion instrument 400 is completed.

In this way, in the embodiment, the respective long-side frames 403*a* and short-side frames 403*b* are configured to be able to be connected with and separated from each other. Thus, compared with the case where the frame 3 is connected in an annular shape as in the first embodiment, the respective parts of the frame 403 before assembling can be miniaturized.

Then, the configuration of the percussion instrument 400 is further described with reference to (a) and (b) of FIG. 7. In FIG. 7, (a) is a partially enlarged cross-sectional view of the percussion instrument 400 taken along a line VIIa-VIIa in (a) of FIG. 7, and (b) is a partially enlarged cross-sectional view of the percussion instrument 400 taken along a line VIIb-VIIb in (a) of FIG. 7. In (a) of FIG. 7, the clamp C (see (a) of FIG. 5) is omitted.

As shown in (a) and (b) of FIG. 7, an opposing interval between the support part 30 and the wall part 32 of the long-side frame 403*a* is formed to be the same as (or slightly greater than) the plate thickness of the long-side frame body 11. Accordingly, when the long-side frame body 11 is pressed by the short-side frame body 12, the long-side frame body 11 can be displaced only in the downward direction along the support part 30 and the wall part 32, and tension can be uniformly applied to the membrane 10.

A covering part 436*a* protruding from the upper end side of the wall part 32 of the long-side frame 403*a* to the inner peripheral side is integrally formed with the wall part 32 of the long-side frame 403*a*. Since the covering part 436*a* can cover the upper side of the long-side frame body 11 held in the holding space S1, the appearance of the percussion instrument 400 can be favorable.

The sheet sensor 5 is bonded to the upper surface of the long-side frame 403*a*, and the sheet sensor 5 is covered by a cover 406 that is a rubber-like elastic body. The cover 406 includes a pair of foot parts 460 extending downward from the two ends of the cover 406 in the width direction (the left-right direction of (a) of FIG. 7). In the pair of foot parts 460, the foot part 460 located on the outer edge side of the cover 406 (the left side of (a) of FIG. 7) is fit into a groove extending in the longitudinal direction (a direction perpendicular to the paper surface of (a) of FIG. 7) of the upper surface of the long-side frame 403*a*.

A bent portion bent from the lower end side of the foot part 460 located on the inner edge side of the cover 406 (the right side of (a) of FIG. 7) of the pair of foot parts 460 to the outer peripheral side is formed in the foot part 460. With the bent portion being hooked to the lower surface of the covering part 436*a* of the long-side frame 403*a*, the cover 406 is fixed to the long-side frame 403*a*. Accordingly, in addition to the function of covering the top of the long-side frame body 11, the covering part 436*a* is also capable of the function of hooking the cover 406.

On the outer peripheral side of the wall part 32 of the long-side frame 403*a*, a cavity S2 extending in the longitudinal direction of the long-side frame 403*a* is formed. In addition, in the short-side frame 403*b*, a cavity S3 surrounded by the side frame 403*b*3 (the lower part 430*b*3, the side part 431*b*3, and the upper part 432*b*3, respectively) and the support frame 403*b*1 is formed. The cavity S3 is linked with the cavity S2 of the long-side frame 403*a*.

That is, the cavities S2 and S3 are in connection throughout the entire periphery of the frame 403. Thus, a wire for connecting the sheet sensor 5 and the striking surface sensor 4*a* to a substrate (not shown) can pass through. Accordingly, among the multiple short-side frames 403*b* (see (a) of FIG. 5), a wire of the striking surface sensor 4*a* or the sheet sensor 5 can be connected to a substrate (not shown) provided at one of the short-side frames 403*b* through the cavities S2 and S3. Accordingly, since such wire can be suppressed from being exposed to the outside, the appearance of the percussion instrument 400 can be favorable.

At the lower part 430*b*3 of the side frame 403*b*3, a through hole 434*b*3 is formed at a location facing the head part of the bolt 2. Accordingly, by adjusting the amount of which the bolt 2 is screwed into via the through hole 434*b*3, the tension applied to the membrane 10 can be adjusted.

At the lower part 430*b*3 and the upper part 432*b*3 of the side frame 403*b*3, a through hole 435*b*3 penetrating in the upper-lower direction is formed. The through hole 435*b*3 is a portion where a rod (not shown) supporting the percussion instrument 400 is inserted. The rod inserted into the through hole 435*b*3 is fastened to the clamp C (see FIG. 5) installed to a through hole 436*b*3 of the side frame 403*b*3 (the side part 431*b*3). Accordingly, the percussion instrument 400 is supported by the rod.

In a state in which the lower part 430*b*3 of the side frame 403*b*3 is fixed to the support frame 403*b*1, the inner edge of the upper part 432*b*3 of the side frame 403*b*3 is overlapped with the fixed part 430*b*2 of the upper frame 403*b*2. Accordingly, the upper frame 403*b*2 can be suppressed from detaching from the wall part 32 of the support frame 403*b*1.

Here, if it is configured that the covering part 431*b*2 of the short-side frame 403*b* (the upper frame 403*b*2) is also integrally formed with the wall part 32 of the support frame 403*b*1, like the covering part 436*a* of the long-side frame 403*a*, it is necessary to insert the short-side frame body 12 from the two ends (ends parts in a direction perpendicular to the paper surface of (a) of FIG. 7) of the peripheral direction of the holding space S1 of the support frame 403*b*1. Such insertion of the short-side frame body 12 from the two ends of the peripheral direction of the support frame 403*b*1 (holding space S1) is difficult in a state in which the long-side frame 403*a* is installed to the long-side frame body 11.

Comparatively, in the embodiment, the covering part 431*b*2 of the short-side frame 403*b* (the upper-side frame 403*b*2) is detachable with respect to the wall part 32 of the support frame 403*b*1. Therefore, the short-side frame body 12 can be inserted from the upper side of the holding space S1 of the support frame 403*b*1. Accordingly, in a state in which each long-side frame 403*a* is installed to the long-side frame body 11 (the state of (a) of FIG. 6) as well, the support frame 403*b*1 can be fit between the long-side frames 403*a* from a lower part.

Accordingly, even in the case where the covering part 436*a* is integrally formed with the wall part 32 of the long-side frame 403*a*, that is, even in the case where the long-side frame body 11 can only be inserted from the two end sides of the long-side frame 403*a* (the holding space S1) in the peripheral direction, the connection of the respective frames 403*a* and 403*b* (the assembling of the percussion instrument 400) can be easy, while the long-side frame bodies 11 and the short-side frame bodies 12 are inserted into the holding space S1 of the long-side frames 403*a* and the short-side frames 403*b*. In other words, it is not necessary to attach/detach the covering part 436*a* of the long-side frame 403*a* with respect to the wall part 32, and the covering part 436*a* of the long-side frame 403*a* and the wall part 32 can be formed integrally. Thus, the number of parts can be reduced.

Although the description has been made based on the embodiment, the invention is not limited to the above. It can be easily inferred that various improvements and modifications are possible within a range that does not deviate from the gist of the invention. For example, in the embodiments, a portion or the entirety of one embodiment may replace or be combined with a portion or the entirety of another one or more embodiments to configure the percussion instruments 100, 200, 300, and 400. Accordingly, for example, it is possible to divide the frames 3, 203, and 303 of the first to third embodiments like the frame 403 (the long-side frames 403*a* and 403*b*) of the fourth embodiment, and it is also possible to make the membrane 10 (frame 403) of the fourth embodiment circular like the membrane 310 (frame 303) of the third embodiment.

In addition, although the second embodiment is described with the case where the bolt 2 is screwed into the long-side frame body 211, it is also possible to screw the bolts 2 into the long-side frame body 11 and the arc frame body 311 to apply tension to the membranes 10 and 310.

Although the respective embodiments are described with the case where the membrane 10 is mesh-like, the invention is not limited thereto. For example, the membrane 10 may also be formed by using a film made by synthetic resin or other conventional materials.

Although the respective embodiments are described with the case where each of the long-side frame bodies 11 and 211, the short-side frame bodies 12, 212, and the arc frame bodies 311, 312*a*, and 312*b* is pulled by the bolt 2 to apply tension to the membrane 10, that is, the tension application member is the bolt 2, the invention is not limited thereto. According to the conventional art (e.g., Japanese Laid-open No. 2019-148623), it may also be configure to press each frame body toward the side of the body (frame) of the percussion instrument by using another tension application member, such as an annular loop. In such configuration as well, since the respective frame bodies aligned along the peripheral direction can be pulled, tension can be uniformly applied to the membrane 10.

Although the respective embodiments are described with the configuration in which two bolts 2 are screwed into the long-side frame body 211 or one bolt 2 is screwed into the short-side frame body 12 or 212 or the arc frame bodies 312*a* and 312*b*, the invention is not limited thereto. For example, it may also be configured that one or three or more bolts 2 are screwed into the long-side frame body 211 or multiple bolts 2 are screwed into the short-side frame body 12 or 212 or the arc frame bodies 312*a* and 312*b*.

Although the respective embodiments are described with the case where each of the long-side frame bodies 11 and 211, the short-side frame bodies 12, 212, and the arc frame bodies 311, 312*a*, and 312*b* made of metal is bonded to the membrane 10, the invention is not limited thereto. For example, the respective frame bodies may also be formed by using a resin material. In such case, the respective frame bodies may also be integrally formed with the membrane 10 through molding.

In addition, the respective frame bodies may also be bonded to the membrane 10 by other fixing means, such as rivets. In addition, in the case of performing such bonding, it is not always necessary to sandwich the outer edge of the membrane 10 by using the pair of fixing frames 11*a*, 11*b*, 12*a*, 12*b*.

Although the respective embodiments are described with the case where the long-side frame bodies 11 and 211 (arc frame body 311) are longer than the short-side frame bodies 12 and 212 (arc frame bodies 312*a* and 312*b*), the invention is not limited thereto. For example, the respective frame bodies may also have the same length.

The first, second, and fourth embodiments are described with the case where the membrane 10 (the frames 3, 203, and 403) is in a hexagon shape. However, the invention is not limited thereto. For example, the membrane 10 (the frames 3, 203, and 403) may also be in another polygonal shape (regular polygonal shape), such as a triangular shape, a rectangular shape.

The first, second, and fourth embodiments are described with the case where multiple striking surface sensors 4*a* to 4*c* are provided in the vicinities of the vertexes 10*c* of the membrane 10. However, the invention is not limited thereto. For example, the striking surface sensors 4*a* to 4*c* may also be provided on a central side of the membrane with respect to the vicinities of such vertexes 10*c*. In addition, it may also be configured to detect the striking to the membrane 10 by using one striking surface sensor.

The first, second and fourth embodiments describe the percussion instruments 100, 200, and 400 (electronic percussion instruments) including the striking surface sensors 4*a* to 4*c* and the sheet sensors 5, and the third embodiment describes the percussion instrument 300 without such sensors. However, the invention is not limited thereto. For example, the striking surface sensors 4*a* to 4*c* and the sheet sensors 5 of the percussion instruments 100, 200, and 400 may be omitted, and sensors equivalent to the striking surface sensors 4*a* to 4*c* and the sheet sensors 5 may also be provided in the percussion instrument 300.

In the fourth embodiment, the case where the cavity S2 is formed on the outer peripheral side of the wall part 32 of the long-side frame 403*a* is described. However, the invention is not limited thereto. For example, the cavity S2 may also be omitted.

In the fourth embodiment, the case where the covering part 436*a* is integrally formed with the wall part 32 of the long-side frame 403*a* is described. However, the invention is not limited thereto. For example, like the covering part 431*b*2 (the upper-side frame 403*b*2) of the short-side frame 403*b*, the covering part 436*a* may also be configured separately from the wall part 32 of the long-side frame 403*a*.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A drumhead, comprising:
a membrane, forming a striking surface of a percussion instrument; and
a plurality of frame bodies, connected to an outer edge of the membrane and aligned along the outer edge of the membrane,
wherein in a case of being installed to the percussion instrument, each of the plurality of frame bodies is pulled to apply tension to the membrane,
wherein the plurality of frame bodies are at least formed by a plurality of first frame bodies and a second frame body which is arranged between the plurality of first frame bodies and in which two ends are overlapped with adjacent ones of the first frame bodies, and
by pulling the second frame body, the first frame bodies are pressed against the second frame body.

2. The drumhead as claimed in claim 1, wherein the second frame body is shorter than the first frame body.

3. The drumhead as claimed in claim 1, wherein the frame body comprises a pair of fixing frames fixed to the outer edge of the membrane, and
by bonding the pair of fixing frames sandwiching the outer edge of the membrane that is mesh-like to each other, the frame body is fixed to the membrane.

4. The drumhead as claimed in claim 3, wherein the frame body is pulled by screwing a bolt into the frame body made of metal.

5. The drumhead as claimed in claim 2, wherein the frame body comprises a pair of fixing frames fixed to the outer edge of the membrane, and by bonding the pair of fixing frames sandwiching the outer edge of the membrane that is mesh-like to each other, the frame body is fixed to the membrane.

6. A percussion instrument, comprising:

the drumhead as claimed in claim 1;

a frame, being annular and having a support part supporting the membrane on an inner peripheral side with respect to the frame body of the drumhead; and a tension application member, pulling downward each of the plurality of frame bodies on an outer peripheral side of the support part of the frame.

7. The percussion instrument as claimed in claim 6, wherein the membrane is formed in a polygonal shape, and each of the plurality of frame bodies is formed in a shape along each side of the membrane.

8. The percussion instrument as claimed in claim 7, wherein the frame is formed by a plurality of first frames aligned along a peripheral direction of the frame and a second frame provided between the plurality of first frames and able to be connected with and separated from the first frame.

9. The percussion instrument as claimed in claim 8, wherein the frame comprises:

a bottom part extending from a lower part of the support part to an outer peripheral side;

a wall part, protruding upward from the bottom part and forming, with the support part, a holding space for the frame body; and a covering part, protruding from an upper end side of the wall part to the inner peripheral side to cover an upper side of the frame bodies.

10. The percussion instrument as claimed in claim 9, wherein the covering part of the first frame is formed integrally with the wall part, with two ends of the holding space in a peripheral direction of the frame being open, the first frame is configured to be insertable by the frame body from an open portion, and in the second frame, the covering part is able to be attached to and detached from the wall part.

11. The percussion instrument as claimed in claim 9, wherein the frame comprises a cavity formed on the outer peripheral side with respect to the holding space and extending in the peripheral direction of the frame.

12. The percussion instrument as claimed in claim 10, wherein the frame comprises a cavity formed on the outer peripheral side with respect to the holding space and extending in the peripheral direction of the frame.

13. The percussion instrument as claimed in claim 7, comprising:

a plurality of sensors, provided in vicinities of respective vertexes of the polygonal membrane, and detecting a vibration of striking to the membrane, wherein different musical sounds are generated in accordance with a striking location detected by the plurality of sensors.

14. A percussion instrument, comprising:

the drumhead as claimed in claim 2;

a frame, being annular and having a support part supporting the membrane on an inner peripheral side with respect to the frame body of the drumhead; and a tension application member, pulling downward each of the plurality of frame bodies on an outer peripheral side of the support part of the frame.

15. A percussion instrument, comprising:

the drumhead as claimed in claim 3;

a frame, being annular and having a support part supporting the membrane on an inner peripheral side with respect to the frame body of the drumhead; and a tension application member, pulling downward each of the plurality of frame bodies on an outer peripheral side of the support part of the frame.

16. A percussion instrument, comprising:

the drumhead as claimed in claim 4;

a frame, being annular and having a support part supporting the membrane on an inner peripheral side with respect to the frame body of the drumhead; and a tension application member, pulling downward each of the plurality of frame bodies on an outer peripheral side of the support part of the frame.

17. A tension application method, applying tension to a membrane of a drumhead which comprises: the membrane, forming a striking surface of a percussion instrument; and a plurality of frame bodies connected to an outer edge of the membrane and aligned along the outer edge of the membrane, wherein the plurality of frame bodies are at least formed by a plurality of first frame bodies and a second frame body which is arranged between the plurality of first frame bodies and in which two ends are overlapped with adjacent ones of the first frame bodies, and the tension application method comprising:

applying the tension to the membrane by pulling each of the plurality of frame bodies in a case where the drumhead is installed to the percussion instrument, and by pulling the second frame body, the first frame bodies are pressed against the second frame body.

* * * * *